US005132667A

United States Patent [19]

Cranford

[11] Patent Number: 5,132,667

[45] Date of Patent: Jul. 21, 1992

[54] CRANFORD ALERT SYSTEM - BURGLAR ALARM

[76] Inventor: Barbara J. Cranford, 888 Cross Creek Way, Lawrenceville, Ga. 30243

[21] Appl. No.: 673,855

[22] Filed: Mar. 21, 1991

Related U.S. Application Data

[63] Continuation-in-part of Ser. No. 518,956, May 4, 1990, abandoned.

[51] Int. Cl.$^5$ .......... E05B 45/06; H01H 3/16; B60R 25/10

[52] U.S. Cl. .......... 340/542; 70/DIG. 49; 200/61.67; 340/426

[58] Field of Search .......... 340/542-543, 340/528, 426, 428, 687, 457.1; 200/550, 61.67, 61.69; 70/DIG. 49, 441, 358

[56] References Cited

U.S. PATENT DOCUMENTS

| | | | |
|---|---|---|---|
| 2,870,281 | 1/1959 | Mitchell | 340/546 X |
| 3,646,285 | 2/1972 | Farrell et al. | 200/573 X |
| 3,890,608 | 6/1975 | Peterson | 70/DIG. 49 X |
| 4,354,174 | 10/1982 | Heidman, Jr. | 340/428 X |
| 4,455,847 | 6/1984 | Hung | 70/358 X |
| 4,516,417 | 5/1985 | Parrock | 70/384 |
| 4,563,886 | 1/1986 | Kletzmaier et al. | 70/DIG. 49 X |
| 4,663,611 | 5/1987 | Humphrey | 340/542 |
| 4,726,206 | 2/1988 | Hsu | 70/441 |
| 4,772,877 | 9/1988 | Rice, Jr. et al. | 340/543 |
| 4,901,057 | 2/1990 | Suneborn | 340/542 |

*Primary Examiner*—Jin F. Ng
*Assistant Examiner*—Thomas J. Mullen, Jr.
*Attorney, Agent, or Firm*—Jones, Askew & Lunsford

[57] ABSTRACT

A locking arrangement with built-in alarm mechanism utilizing a contact between portions of a split bolt arrangement as the prime security measure is described. Correct sequencing of both the locking and unlocking actions is required to prevent alarm. Two realizations are described: a self-contained unit for building doors; and an automobile unit with central alarm, alarm sensors for ignition and other locations subject to tampering (hood, trunk, battery), and a set resistance method to prevent disarming by either circuit opening or shorting techniques.

9 Claims, 2 Drawing Sheets

CRANFORD ALERT SYSTEM - BURGLAR ALARM

RIGHTS TO INVENTIONS

Development of this invention did not involve any federal funding or sponsorship.

This is a continuation-in-part of U.S. patent application Ser. No. 07/518,956, filed May 4, 1990, now abandoned by Barbara Jean Cranford.

REFERENCES CITED

U.S. Patent Documents

| | | |
|---|---|---|
| 3,890,608 | 6/1975 | Peterson |
| 4,563,886 | 1/1986 | Kletzmaier et al. |
| 4,663,611 | 5/1987 | Humphrey |
| 4,726,206 | 2/1988 | Hsu |
| 4,772,877 | 9/1988 | Rice, Jr. et al. |

BACKGROUND OF THE INVENTION

This invention relates to an alarmed lock, suitable for installation in either doorways or automobiles, which contains: a dual bolt system requiring correct sequential acitvation or deactivation to prevent alarm; protection against disarming by a potential intruder; an integral power source for sounding the alarm.

Two bolts locks are generally characterized by separate key requirements, by electrically coded controls by rotating combination controls, or by a combination of the above. Rice (U.S. Pat. No. 4,772,877) proposed a method for indicating the security situation on safes using the properties of rotating combination locks, Peterson (U.S. Pat. No. 3,890,608) proposed a method for opening a door using a combination of electrical control an sensing from a remote location, Humphrey (U.S. Pat. No. 4,663,611) proposed a built-in alarm for flexible loops wherein continuity is assured by the physical construction of the lock (joined in a closed-loop arrangement), and Kletzmaier has proposed (U.S. Pat. No. 4,563,886) using two bolts wherein one is manually activated while the other is electrically actuated. Hsu (U.S. Pat. No. 4,726,206) proposed an alarmed lock whose alarming purpose was to control access to the keyed cylinder.

SUMMARY OF THE INVENTION

An object of the invention is to provide a lock requiring specific sequential key operation to lock or unlock if alarm is to be prevented.

Another object of the invention is to provide an internal mechanism for sensing the sequence of locking or unlocking which is not accessible without alarm.

A third object of the invention is to provide a design which cannot be deactivated through disruption of an external power source nor from the "outside" without use of the key.

In summary, the lock arrangement is generally made up of a "split" bolt which depends on a specific relation between the two portions to prevent alarm. In the case of the building door lock, the system is entirely self-contained, with its integral battery, sensors, and control circuitry. In the case of the automobile lock, external sensors are required to prevent (1) tampering with the ignition, (2) opening doors, (3) opening the trunk or engine hood, and (4) activation (or deactivation) in the event of a moving accident.

DETAILED DESCRIPTION OF THE INVENTION

Figure 1A:
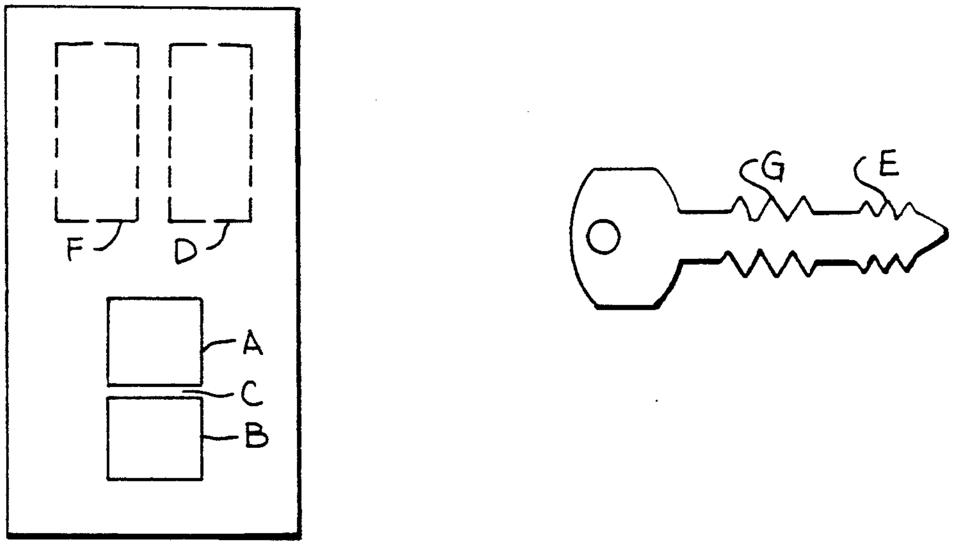
FIG. 1A provides a front view and FIG. 1B provides a side view of the preferred embodiment of the Alarmed Lock System.
Figure 1B:
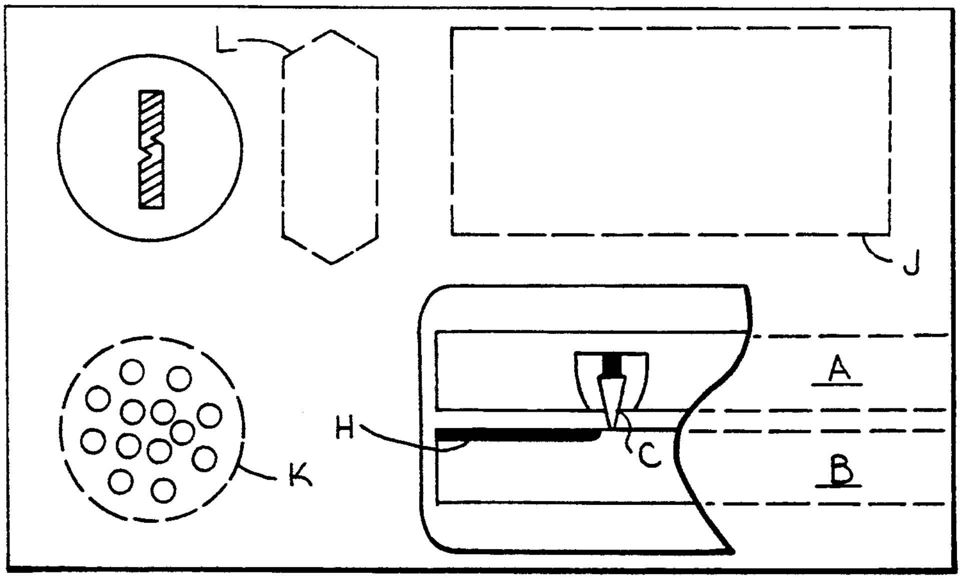

FIG. 1 shows the physical construction of the building door lock. The lock and alarm are activated through a specific sequence of key or internal handle operation: movement of the upper half of the split bolt A first maintains a conductive contact with the lower half of the split bolt B through the contact mechanism C. The movement of the upper half A is controlled through clockwise rotation of the lock tumbler set D as activated by the outer key combination E. Movement of the lower half of the bolt B is controlled through counterclockwise rotation of the lock tumbler set F as activated by the inner key combination G. Electrical contact between the split bolts A and B is required to maintain the alarm in a quiescent state. If the sequence of rotation is incorrect, the contact mechanism C will lose electrical continuity with bolt B through its position over an insulating strip H. This will cause the alarm to activate as described in the electrical diagram in FIG. 2.

The lock housing also contains housing for a battery J, an alarm K, and the necessary electronic control circuitry L. No external power or other wiring is required.

From inside the doorway, a manual operation using a stanard lock handle is envisioned. Once again, correct sequence of operation is required to assure that electrical contact is maintained between the two portion of the lock bolt.

The use of dual combination keys increases the security of the system through an inherent doubling of the key combinations. The use of dual tumbler sets increases the complexity of operation using standard lock-picking burglar tools. The sequential operation requirement with different directions of rotation also reduces the probability of successful lock-picking techniques.

Figure 2:
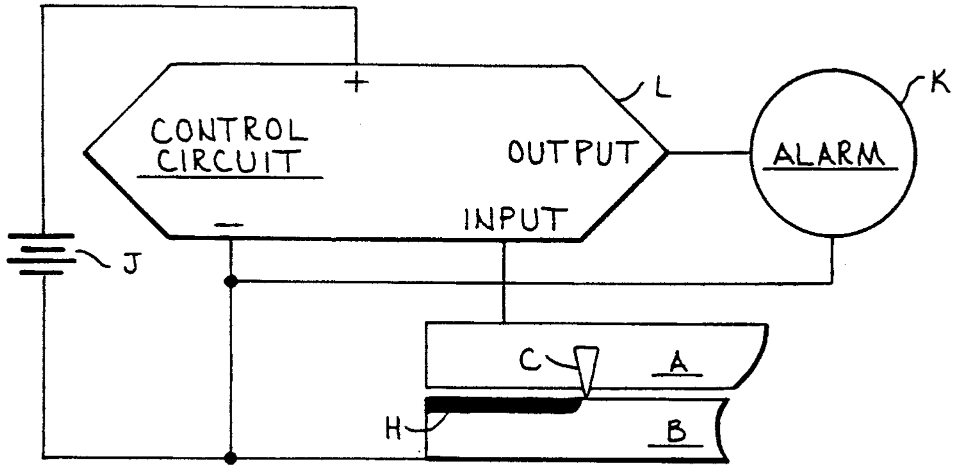
FIG. 2 is schematic diagram of the preferred embodiment of the present invention.

FIG. 2 shows the electrical connections required to set an maintain the operation. If the contact C between the bolts A and B fails to maintain a complete electrical circuit, power is applied to the alarm K. Battery J is also monitored by the control circuitry similar to that method employed by such safety devices as smoke alarms so that a low voltage condition will cause the alarm K to "chirp" periodically until the battery is replaced.

Figure 3:
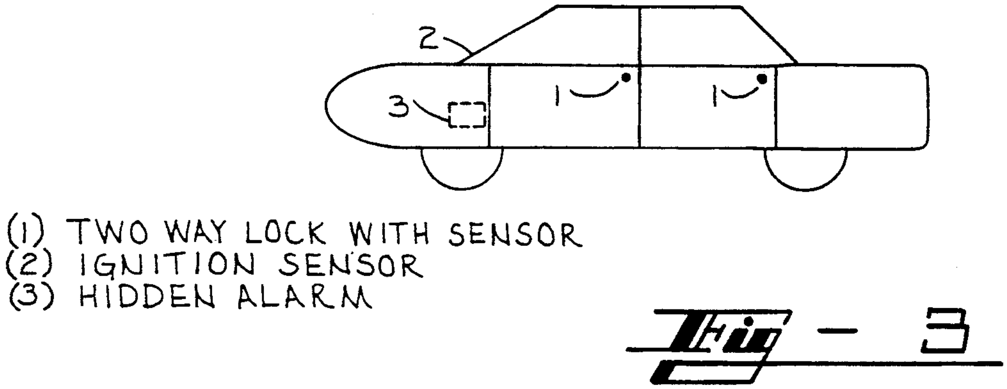
FIG. 3 is an illustration of the Alarmed Lock System installed in an automobile.

FIG. 3 shows potential locations for installation of the alarm system on an automobile. The primary requirement is for the alarm 3 to be installed in a location normally inaccessible while the vehicle is parked without disturbing one of the sensors which will set it off.

Figure 4:
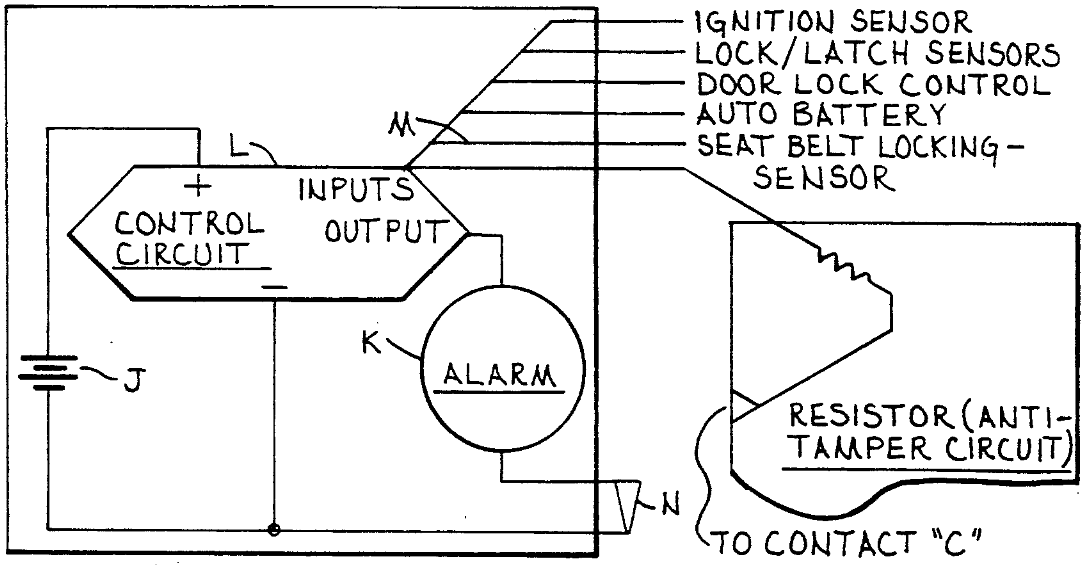
FIG. 4 is a schematic diagram of an embodiment of the present invention installed in an automobile.

FIG. 4 shows the electrical connections required to set an maintain the operation of the automobile alarm. The alarm is activated either through an electrical sequence set up by activating electric door locks or through a sequential operation of door keys in either front door (the option of activation is pre-set depending on whether the automobile is equipped with electric door lock controls). if the electric door lock control method is installed, the sequencing is automatic: closing of the final door's latch will activate the second bolt for all doors. Similarly, opening of one of the front doors using the key will deactivate all second bolts simultaneously with disarming the alarm circuit. The automobile lock alarm sensing system depends on maintaining a pre-set resistance (allowing tolerance for weather, aging, etc.) between the contact sensors, the alarm mechanism and the automobile ground system. Thus, tampering by either opening or shorting connections will set off the alarm. Continuity with the automobile's standard battery hookup is also monitored, so that tampering with that will also be detected and the alarm will sound. Note the safety feature of connection M to the seat belt locking sensor. If the alarm has been set (vehicle parked), an outside jarring sensation which would activate the sensor will set off the alarm. If the alarm has not been set (vehicle in operation), the jarring sensation necessary to activate the seat belt locking mechanism will disable the alarm in its entirety, including prevention of the setting of the second bolt half. This feature is equipped with a special timing mechanism which will allow the alarm to return to normal operation approximately one hour after activation, thus preventing an inadvertant "bump" either in the parked or operating modes from permanently disabling the alarm system. Connection N is n alarm deactivation key located under the instrument panel of the automobile for silencing the alarm by the owner using the standard car door key.

I claim:

1. An alarmed lock system comprising:

a first lock tumbler;

a first bolt, wherein movement of said first bolt is controlled by said first lock tumbler;

a second lock tumbler;

a second bolt, wherein movement of said second bolt is controlled by said second lock tumbler;

an electrical contact located on said first bolt for providing an electrical connection between said first bolt and said second bolt when said first bolt is in a first position with respect to said second bolt;

insulating means located on said second bolt for breaking said electrical connection when said first bolt is in a second position with respect to said second bolt; and an alarm device responsive to the state of said electrical connection.

2. The alarmed lock system of claim 1 and further comprising a key which operates both said first lock tumbler and said second lock tumbler.

3. The alarmed lock system of claim 2 wherein said state of said electrical connection is not changed if said key is first rotated in a first predetermined direction and then rotated in a second predetermined direction.

4. The alarmed lock system of claim 3 wherein said state of said electrical connection is changed if said key is first rotated in said second predetermined direction and then rotated in said first predetermined direction.

5. An alarmed lock system for use with a vehicle having a seat belt locking sensor, comprising:

a first bolt;

a second bolt;

an electrical contact located on said first bolt for providing an electrical connection between said first bolt and said second bolt when said first bolt is in a first position with respect to said second bolt;

insulating means located on said second bolt for breaking said electrical connection when said first bolt is in a second position with respect to said second bolt; and an alarm device responsive to the state of said electrical connection;

wherein said alarm device has a first mode of operation for use when said vehicle is parked wherein a signal provided by said seat belt locking sensor causes said alarm device to provide an alarm signal, and a second mode of operation for use when said vehicle is in operation wherein said signal provided by said seal belt locking sensor causes said alarm device to be temporarily disabled.

6. A lock for an alarm system responsive to the state of an electrical connection, comprising:

a first bolt;

a first lock tumbler, wherein movement of said first bolt is controlled by said first lock tumbler;

a second bolt;

a second lock tumbler, wherein movement of said second bolt is controlled by said second lock tumbler;

an electrical contact located on said first bolt for providing said electrical connection between said first bolt and said second bolt when said first bolt is in a first position with respect to said second bolt; and insulating means located on said second bolt for breaking said electrical connection when said first bolt is in a second position with respect to said second bolt.

7. The lock of claim 6 and further comprising a key which operates both said first lock tumbler and said second lock tumbler.

8. The lock of claim 7 wherein said state of said electrical connection is not changed if said key is first rotated in a first predetermined direction and then rotated in a second predetermined direction.

9. The lock of claim 8 wherein said state of said electrical connection is changed if said key is first rotated in said second predetermined direction and then rotated in said first predetermined direction.

* * * * *